(12) United States Patent
Cheng et al.

(10) Patent No.: US 11,718,899 B1
(45) Date of Patent: Aug. 8, 2023

(54) PREPARATION METHOD OF CEMENTED CARBIDE WITH IRON, COBALT AND COPPER MEDIUM-ENTROPY ALLOY AS BINDING PHASE

(71) Applicant: Hefei University of Technology, Hefei (CN)

(72) Inventors: Jigui Cheng, Hefei (CN); Ruizhi Chen, Hefei (CN); Bin Wang, Hefei (CN); Pengqi Chen, Hefei (CN); Yuyang Li, Hefei (CN); Dang Xu, Hefei (CN)

(73) Assignee: HEFEI UNIVERSITY OF TECHNOLOGY, Hefei (CN)

( * ) Notice: Subject to any disclaimer, the term of this patent is extended or adjusted under 35 U.S.C. 154(b) by 0 days.

(21) Appl. No.: 18/092,211

(22) Filed: Dec. 31, 2022

(30) Foreign Application Priority Data

Mar. 1, 2022 (CN) .......................... 202210197778.0

(51) Int. Cl.
| | |
|---|---|
| C22C 29/00 | (2006.01) |
| B22F 1/103 | (2022.01) |
| B22F 9/22 | (2006.01) |
| B22F 3/16 | (2006.01) |
| C22C 29/08 | (2006.01) |
| B22F 9/04 | (2006.01) |

(52) U.S. Cl.
CPC ............ *C22C 29/005* (2013.01); *B22F 1/103* (2022.01); *B22F 3/16* (2013.01); *B22F 9/22* (2013.01); *C22C 29/08* (2013.01); *B22F 2009/043* (2013.01); *B22F 2202/01* (2013.01); *B22F 2301/10* (2013.01); *B22F 2301/15* (2013.01); *B22F 2301/35* (2013.01); *B22F 2302/10* (2013.01); *B22F 2998/10* (2013.01)

(58) Field of Classification Search
CPC ....... C22C 29/005; C22C 29/08; B22F 1/103; B22F 3/16; B22F 9/22; B22F 2009/043; B22F 2301/35; B22F 2302/10; B22F 2998/10
USPC ......................................................... 419/18
See application file for complete search history.

(56) References Cited

FOREIGN PATENT DOCUMENTS

| CN | 109371307 A | 2/2019 |
|---|---|---|
| CN | 111286664 A | * 6/2020 |

OTHER PUBLICATIONS

CN-111286664-A Translation (Year: 2020).*

(Continued)

*Primary Examiner* — Brian D Walck
*Assistant Examiner* — Danielle Carda
(74) *Attorney, Agent, or Firm* — Zhigang Ma

(57) ABSTRACT

A preparation method of cemented carbide with FeCoCu medium-entropy alloy as binding phase is provided. The preparation method includes: 1) preparing FeCoCu precursor powders by solution combustion synthesis; 2) preparing FeCoCu medium-entropy alloy powders by mechanical alloying; 3) evenly mixing the FeCoCu medium-entropy alloy powders with ultra-fine WC powders and a binder to obtain mixed powders and pressing the mixed powders into a shaped green body; 4) preparing a WC-FeCoCu cemented carbide by microwave sintering after removing the binder from the shaped green body. The preparation method reduces sintering temperature and time and obtains a new-type cemented carbide with fine grains, high hardness and good toughness while reducing the cost.

6 Claims, 3 Drawing Sheets

(56) References Cited

OTHER PUBLICATIONS

Gao Peng, Ma Zihong, Gu Ji, Ni Song, Suo Tao, Li Yulong, Song Min, Mi Yaorong, Liao Xiaozhou, Exceptional high-strain-rate tensile mechanical properties in a CrCoNi medium-entropy alloy [J/OL]. Science China Materials: 1-9 [Jan. 14, 2022].

Ehsan Ghasali Ghasali E, Alizadeh M, Ebadzadeh T, et al. Investigation on microstructural and mechanical properties of B4C-aluminum matrix composites prepared by microwave sintering, 2015.

CNIPA, Notification of a First Office Action for CN202210197778.0, dated Jul. 8, 2022.

Hefei University of Technology (Applicant), Reply to Notification of a First Office Action for CN202210197778.0, w/(allowed) replacement claims, dated Jul. 15, 2022.

CNIPA, Notification to grant patent right for invention in CN202210197778.0, Aug. 1, 2022.

* cited by examiner

US 11,718,899 B1

PREPARATION METHOD OF CEMENTED CARBIDE WITH IRON, COBALT AND COPPER MEDIUM-ENTROPY ALLOY AS BINDING PHASE

TECHNICAL FIELD

The disclosure belongs to a technical field of ultrafine grained cemented carbide preparation with new-type binding phase, and in particular to a rapid preparation method of ultrafine grained cemented carbide with iron (Fe), cobalt (Co) and copper (Cu) medium-entropy alloy as binding phase.

BACKGROUND

Tungsten Carbide (WC, also referred to Wolfram Carbide)-Cobalt (Co) cemented carbide is a kind of alloy produced by powder metallurgy process with WC as hard phase and the metal Co as binding phase. Because of high hardness, high wear resistance, and high compressive strength, the WC-Co cemented carbide is widely used as a material in military, aerospace, mechanical processing, oil drilling, mining tools, electronic communications, architecture, and other fields. However, when the WC-Co cemented carbide is prepared by conventional liquid phase sintering method, WC grains are easy to grow, which makes properties of the cemented carbide worse. On the other hand, with an increasing application of the metal Co in new energy materials, superalloys and other fields, the metal Co resources are increasingly strained. With a development of modern industrial technology, service conditions are more stringent, the demand for high-performance cemented carbide is increasing, and new requirements are put forward for structure and properties of the cemented carbide. It is of great significance to research and develop new cemented carbide with ultra-fine grain structure with low cobalt binding phase or cobalt free phase.

Medium-entropy alloy is an alloy formed by three metal elements with equal or near equal atomic ratio. Because of simple crystal structure and low stacking faults, strength of the medium-entropy alloy is higher than that of any of the components, and because of high toughness and good fracture toughness, the medium-entropy alloy has received more and more attention in recent years. Gao et al. (Gao Peng, Ma Zihong, Gu Ji, Ni Song, Suo Tao, Li Yulong, Song Min, Mi Yaorong, Liao Xiaozhou, Exceptional high-strain-rate tensile mechanical properties in a CrCoNi medium-entropy alloy [J/OL]. Science China Materials: 1-9 [2022-01-14]) have prepared CrCoNi medium-entropy alloy by vacuum induction melting. The experimental results show that the CrCoNi alloy has high strength and excellent plasticity, and is a prospecting alloy material. However, the cost of preparing medium-entropy alloys by vacuum melting is quite high, and it is difficult to be used in industrial production, while the cost of preparing medium-entropy alloy powders by mechanical alloying is low. But if the grinding medium such as anhydrous ethanol is not added in the process of the mechanical alloying, the distribution of materials will be uneven, which will affect performance of the sample. If the grinding medium is added, the rotating energy and preparation efficiency will be reduced. Chinese patent with the publication number of CN109371307A discloses a preparation method of WC-based cemented carbide with high-entropy alloy powders as binding phase, the patent requires that the high-entropy alloy powders are directly prepared by high-energy ball-milling, but the method failed to successfully prepare high-entropy alloy powders with uniform composition as the binding phase, which results in uneven microstructure in the cemented carbide samples and large difference in WC grain size.

The properties of WC-Co cemented carbides increase with a decrease of WC grain size. The WC grains grow through the dissolution-precipitation mechanism, which is difficult to obtain ultra-fine grained cemented carbides. Rapid sintering method is an effective way to solve the above problem. However, many rapid sintering methods, such as spark plasma sintering and hot-pressing sintering, are difficult to be used in industrial production because of high cost. Microwave sintering, as a new rapid sintering method, is widely used in the preparation of ceramic materials because of a unique and fast sintering mechanism and a function of heating materials thoroughly, which greatly shortens the sintering process of materials. Ehsan Ghasali (Ghasali E, Alizadeh M, Ebadzadeh T, et al. Investigation on microstructural and mechanical properties of $B_4C$-aluminum (Al) matrix composites prepared by microwave sintering [J]. Journal of Materials Research and Technology, 2015, 26 (4)) has successfully prepared $B_4C$—Al ceramic materials with uniform grain size and excellent mechanical properties by microwave sintering at 850° C. At present, it has not been reported to prepare the cemented carbide with medium-entropy alloy as binding phase by the microwave sintering method.

Therefore, by improving the binding phase and using ultra-fine WC powders as raw material combined with the microwave sintering method, new-type cemented carbides with excellent structure and performance can be obtained, which can better meet the needs of modern industry.

SUMMARY

An object of the disclosure is to provide a preparation method of cemented carbide with FeCoCu medium-entropy alloy as binding phase, which is used to solve a problem of an abnormal growth of Tungsten Carbide (WC) in the cemented carbide and a problem of performance of traditional cemented carbide unsatisfied with needs the in modern industry.

In order to achieve the above object, the disclosure provides a technical scheme as follows.

A preparation method of cemented carbide with FeCoCu medium-entropy alloy as binding phase includes the following steps 1) to 4).

Step 1) preparing precursor powders, including:

dissolving cobaltous nitrate, cupric nitrate, ferric nitrate and glycine with a molar ratio in deionized water to obtain mixed solution after ultrasonic vibration and heating the mixed solution in a muffle furnace to obtain porous oxide precursor powders.

Step 2) preparing FeCoCu medium-entropy alloy powders, including:

fully grinding the oxide precursor powders obtained in step 1), performing reduction on the grinded oxide precursor powders with hydrogen to obtain FeCoCu mixed powders and performing high-energy ball-milling and sieving on the FeCoCu mixed powders to obtain the FeCoCu medium-entropy alloy powders.

Step 3) preparing WC-FeCoCu mixed powders, including:

mixing the FeCoCu medium-entropy alloy powders obtained in step 2) with ultra-fine Tungsten Carbide (WC) powders in a mass ratio to obtain mixed alloy powders, adding polyethylene glycol (PEG) as a binder and ethanol absolute as a medium to the mixed alloy powders to obtain mixed slurry after ball-milling, drying the mixed slurry in vacuum, grinding and sieving the mixed slurry to obtain the WC-FeCoCu mixed powders.

Step 4) preparing a WC-FeCoCu cemented carbide, including:

pressing the WC-FeCoCu mixed powders obtained in step 3) into shape in a steel mold under a pressure between 100 mega Pascal (MPa) and 300 MPa to obtain a shaped green body, placing the shaped green body in a tubular furnace to remove the binder under hydrogen atmosphere to obtain a binder-removing green body, and performing microwave sintering on the binder-removing green body in a microwave sintering furnace under a mixed atmosphere of nitrogen ($N_2$) and hydrogen ($H_2$) to obtain the WC-FeCoCu cemented carbide.

In an illustrated embodiment of the disclosure, the molar ratio of cobaltous nitrate:cupric nitrate:ferric nitrate:glycine in step 1) is 1:1:1:(3-9).

In an illustrated embodiment of the disclosure, a heating temperature of the mixed solution in step 1) is between 200 degree Celsius (° C.) and 350° C. and a heating time of the mixed solution is between 1 hour (h) and 5 h.

In an illustrated embodiment of the disclosure, a reductive temperature of the oxide precursor powders in step 2) is between 500° C. and 750° C., and a reductive time of the oxide precursor powders is between 1 h and 4 h.

In an illustrated embodiment of the disclosure, a ball to powder weight ratio of the high-energy ball-milling in step 2) is between 5:1 and 20:1, a rotating speed of the high-energy ball-milling is between 100 revolutions per minute (rpm) and 500 rpm and a time of the high-energy ball-milling is between 12 h and 72 h.

In an illustrated embodiment of the disclosure, a particle size of the ultra-fine WC powders in Step 3) is between 0.4 micrometer (μm) and 0.8 μm.

In an illustrated embodiment of the disclosure, in step 3), the mass ratio of the FeCoCu medium-entropy alloy powders:the ultra-fine WC powders is between 7:3 and 19:1, and a mass of the PEG is between 1% and 5% of a total mass of the WC-FeCoCu mixed powders.

In an illustrated embodiment of the disclosure, a ball to powder weight ratio of the ball-milling in step 3) is between 3:1 and 10:1, a rotating speed of the ball-milling is between 100 rpm and 400 rpm and a time of the ball-milling is between 12 h and 72 h.

In an illustrated embodiment of the disclosure, a temperature of removing the binder in step 4) is between 400° C. and 800° C., and a holding time of removing the binder in step 4) is between 1 h and 5 h.

In an illustrated embodiment of the disclosure, a temperature of the microwave sintering in step 4) is between 1100° C. and 1500° C. and a time of the microwave sintering is between 10 minutes (min) and 60 min.

Compared with the related art, the disclosure has the advantages that:

(1) The preparation method of the disclosure obtains the FeCoCu medium-entropy alloy powders through combustion synthesis of solution and mechanical alloying. Compared with a method of mechanical alloying after a direct mixture, the preparation method of the disclosure mixes the powders more evenly, which is conducive to improving comprehensive performance of the cemented carbide.

(2) The preparation method of the disclosure uses the medium-entropy alloy to replace the cobalt as binding phase of the cemented carbide, which not only improves comprehensive performance of the cemented carbide, but also reduces use of cobalt resources.

(3) The preparation method of the disclosure adopts microwave sintering method to prepare the WC-FeCoCu cemented carbide. Compared with the traditional sintering method, the preparation method of the disclosure greatly shortens sintering time and effectively saves resources. At the same time, the rapid sintering method effectively inhibits WC grains abnormal growth, and makes the cemented carbide grains fine, which is conducive to further improving comprehensive mechanical properties of the cemented carbide.

(4) The preparation method of the disclosure has simple process and can prepare WC-FeCoCu cemented carbides of different shapes and sizes, which is suitable for large-scale production and has a good industrial applying prospect.

BRIEF DESCRIPTION OF DRAWINGS

The disclosure is further described in detail in combination with the attached drawings and embodiments.

DETAILED DESCRIPTION OF EMBODIMENTS

The embodiments of the disclosure are described in detail below through the embodiments, but the following embodiments are only illustrated embodiments in essence. The disclosure can also be implemented or applied through other different embodiments. The details in the specification can also be modified or changed based on different opinions and applications without deviating from the spirit of the disclosure.

Unless otherwise regulated, technical and scientific terms used in the disclosure have the same meanings as commonly understood by those skilled in the art. In addition to the methods, devices and materials used in the embodiments, the disclosure can also be realized by using any method, device and materials of the related art that are similar or equivalent to the methods, devices and materials described in the embodiments of the disclosure according to the mastery of the related art by those skilled in the art and the records of the disclosure.

Figure 1:
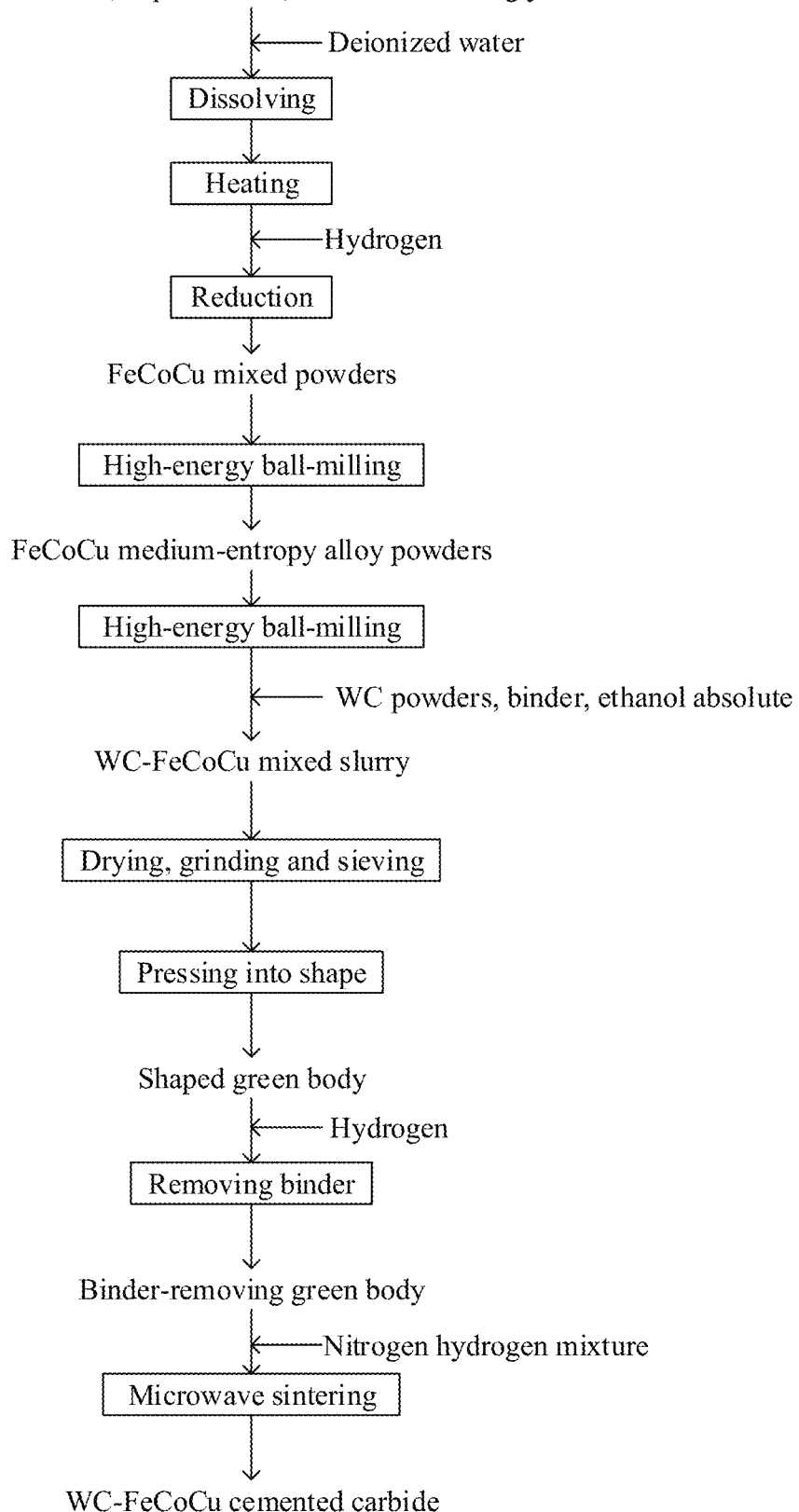
FIG. 1 is a process flowchart of a preparation method of cemented carbide with FeCoCu medium-entropy alloy as binding phase according to the disclosure.

FIG. 1 is the process flowchart of the preparation method of cemented carbide with FeCoCu medium-entropy alloy as binding phase according to the disclosure. The disclosure is further described in detail below according to the process flow diagram as shown in FIG. 1.

Embodiment 1

The embodiment is provided with a preparation method of cemented carbide with FeCoCu medium-entropy alloy as binding phase, including step 1) to step 4).

Step 1) Preparing Precursor Powders

A molar ratio of cobaltous nitrate:cupric nitrate:ferric nitrate:glycine being 1:1:1:9 is dissolved in 100 mL deionized water to obtain mixed solution after ultrasonic vibration, and the mixed solution is heated in a muffle furnace at 350° C. for 1 h to obtain porous oxide precursor powders.

Step 2) Preparing FeCoCu Medium-Entropy Alloy Powders

The porous oxide precursor powders obtained in step 1) is grinded fully, and then reduced by hydrogen at 750° C. for 2 h to obtain FeCoCu mixed powders. The FeCoCu mixed powders is performed high-energy ball-milling and sieved to obtain the FeCoCu medium-entropy alloy powders. A ball to powder weight ratio of the high-energy ball-milling is 20:1; a rotating speed of the high-energy ball-milling is 100 rpm, and a time of the high-energy ball-milling is 12 h.

Step 3) Preparing WC-FeCoCu Mixed Powders

A mass ratio of the FeCoCu medium-entropy alloy powders obtained in step 2): 0.8 μm ultra-fine WC powders being 2:8 mixes to obtain mixed alloy powders. Polyethylene glycol (PEG), 1% of a total mass of WC-20FeCoCu, as a binder and 100 milliliters (mL) ethanol absolute are added into the mixed alloy powders to obtain mixed slurry after ball-milling. The mixed slurry is dried in vacuum, ground, and sieved to prepare WC-20FeCoCu (referred to a mass fraction of FeCoCu being 20%) powders mixture. A ball to powder weight ratio of the ball-milling is 5:1, a rotating speed of the ball-milling is 200 rpm, and a time of the ball-milling is 72 h.

Step 4) Preparing a WC-FeCoCu Cemented Carbide

The WC-20FeCoCu powders mixture obtained in step 3) is pressed into shape in a steel mold under a pressure of 100 MPa to obtain a shaped green body; the shaped green body is placed in a tubular furnace to remove the binder under hydrogen atmosphere at 400° C. for 3 h to obtain a binder-removing green body, and then the binder-removing green body is placed in a microwave sintering furnace under a mixed atmosphere of nitrogen and hydrogen at 1200° C. for 35 min to obtain a WC-10FeCoCu cemented carbide.

Embodiment 2

The embodiment is provided with a preparation method of cemented carbide with FeCoCu medium-entropy alloy as binding phase, including step 1) to step 4).

Step 1) Preparing Precursor Powders

A molar ratio of cobaltous nitrate:cupric nitrate:ferric nitrate:glycine being 1:1:1:3 is dissolved in 100 mL deionized water to obtain mixed solution after ultrasonic vibration, and the mixed solution is heated in a muffle furnace at 350° C. for 1 h to obtain porous oxide precursor powders.

Step 2) Preparing FeCoCu Medium-Entropy Alloy Powders

The porous oxide precursor powders obtained in step 1) is grinded fully, and then reduced by hydrogen at 500° C. for 4 h to obtain FeCoCu mixed powders. The FeCoCu mixed powders is performed high-energy ball-milling and sieved to obtain the FeCoCu medium-entropy alloy powders. A ball to powder weight ratio of the high-energy ball-milling is 5:1; a rotating speed of the high-energy ball-milling is 500 rpm, and a time of the high-energy ball-milling is 72 h.

Step 3) Preparing Wolfram Carbide (WC)-FeCoCu Mixed Powders

A mass ratio of the FeCoCu medium-entropy alloy powders obtained in step 2): 0.8 μm ultra-fine WC powders being 3:7 mixes to obtain mixed alloy powders. PEG, 2.5% of a total mass of WC-30FeCoCu, as a binder and 100 mL ethanol absolute are added into the mixed alloy powders to obtain mixed slurry after ball-milling. The mixed slurry is dried in vacuum, ground, and sieved to prepare WC-30FeCoCu powders mixture. A ball to powder weight ratio of the ball-milling is 3:1, a rotating speed of the ball-milling is 400 rpm, and a time of the ball-milling is 12 h.

Step 4) Preparing a WC-FeCoCu Cemented Carbide

The WC-30FeCoCu powders mixture obtained in step 3) is pressed into shape in a steel mold under a pressure of 100 MPa to obtain a shaped green body; the shaped green body is placed in a tubular furnace to remove the binder under hydrogen atmosphere at 600° C. for 2 h to obtain a binder-removing green body, and then the binder-removing green body is placed in a microwave sintering furnace under a mixed atmosphere of nitrogen and hydrogen at 1100° C. for 60 min to obtain a WC-10FeCoCu cemented carbide.

Embodiment 3

The embodiment is provided with a preparation method of cemented carbide with FeCoCu medium-entropy alloy as binding phase, including step 1) to step 4).

Step 1) Preparing Precursor Powders

A molar ratio of cobaltous nitrate:cupric nitrate:ferric nitrate:glycine being 1:1:1:4 is dissolved in 100 mL deionized water to obtain mixed solution after ultrasonic vibration, and the mixed solution is heated in a muffle furnace at 250° C. for 2 h to obtain porous oxide precursor powders.

Step 2) Preparing FeCoCu Medium-Entropy Alloy Powders.

The porous oxide precursor powders obtained in step 1) is grinded fully, and then reduced by hydrogen at 600° C. for 2 h to obtain FeCoCu mixed powders. The FeCoCu mixed powders is performed high-energy ball-milling and sieved to obtain the FeCoCu medium-entropy alloy powders. A ball to powder weight ratio of the high-energy ball-milling is 6:1; a rotating speed of the high-energy ball-milling is 400 rpm, and a time of the high-energy ball-milling is 72 h.

Step 3) Preparing Wolfram Carbide (WC)-FeCoCu Mixed Powders.

A mass ratio of the FeCoCu medium-entropy alloy powders obtained in step 2): 0.4 μm ultra-fine WC powders being 1:9 mixes to obtain mixed alloy powders. PEG, 2.5% of a total mass of WC-10FeCoCu, as a binder and 100 mL ethanol absolute are added into the mixed alloy powders to obtain mixed slurry after ball-milling. The mixed slurry is dried in vacuum, ground, and sieved to prepare WC-10FeCoCu powders mixture. A ball to powder weight ratio of the ball-milling is 3:1, a rotating speed of the ball-milling is 400 rpm, and a time of the ball-milling is 24 h.

Step 4) Preparing a WC-FeCoCu Cemented Carbide

The WC-10FeCoCu powders mixture obtained in step 3) is pressed into shape in a steel mold under a pressure of 100 MPa to obtain a shaped green body; the shaped green body is placed in a tubular furnace to remove the binder under hydrogen atmosphere at 450° C. for 2 h to obtain a binder-removing green body, and then the binder-removing green body is placed in a microwave sintering furnace under a mixed atmosphere of nitrogen and hydrogen at 1300° C. for 20 min to obtain a WC-10FeCoCu cemented carbide.

Embodiment 4

The embodiment is provided with a preparation method of cemented carbide with FeCoCu medium-entropy alloy as binding phase, including step 1) to step 4).

Step 1) Preparing Precursor Powders

A molar ratio of cobaltous nitrate:cupric nitrate:ferric nitrate:glycine being 1:1:1:4.5 is dissolved in 100 mL deionized water to obtain mixed solution after ultrasonic vibration, and the mixed solution is heated in a muffle furnace at 200° C. for 2 h to obtain porous oxide precursor powders.

Step 2) Preparing FeCoCu Medium-Entropy Alloy Powders

The porous oxide precursor powders obtained in step 1) is grinded fully, and then reduced by hydrogen at 600° C. for 2.5 h to obtain FeCoCu mixed powders. The FeCoCu mixed powders is performed high-energy ball-milling and sieved to obtain the FeCoCu medium-entropy alloy powders. A ball to powder weight ratio of the high-energy ball-milling is 10:1; a rotating speed of the high-energy ball-milling is 400 rpm, and a time of the high-energy ball-milling is 48 h.

Step 3) Preparing Wolfram Carbide (WC)-FeCoCu Mixed Powders

A mass ratio of the FeCoCu medium-entropy alloy powders obtained in step 2): 0.6 μm ultra-fine WC powders being 1:19 mixes to obtain mixed alloy powders. PEG, 5% of a total mass of WC-5FeCoCu, as a binder and 100 mL ethanol absolute are added into the mixed alloy powders to obtain mixed slurry after ball-milling. The mixed slurry is dried in vacuum, ground, and sieved to prepare WC-5FeCoCu powders mixture. A ball to powder weight ratio of the ball-milling is 3:1, a rotating speed of the ball-milling is 200 rpm, and a time of the ball-milling is 48 h.

Step 4) Preparing a WC-FeCoCu Cemented Carbide

The WC-5FeCoCu powders mixture obtained in step 3) is pressed into shape in a steel mold under a pressure of 100 MPa to obtain a shaped green body; the shaped green body is placed in a tubular furnace to remove the binder under hydrogen atmosphere at 400° C. for 3 h to obtain a binder-removing green body, and then the binder-removing green body is placed in a microwave sintering furnace under a mixed atmosphere of nitrogen and hydrogen at 1500° C. for 10 min to obtain a WC-10FeCoCu cemented carbide.

Embodiment 5

The embodiment is provided with a preparation method of cemented carbide with FeCoCu medium-entropy alloy as binding phase, including step 1) to step 4).

Step 1) Preparing Precursor Powders

A molar ratio of cobaltous nitrate:cupric nitrate:ferric nitrate:glycine being 1:1:1:6 is dissolved in 100 mL deionized water to obtain mixed solution after ultrasonic vibration, and the mixed solution is heated in a muffle furnace at 300° C. for 2.5 h to obtain porous oxide precursor powders.

Step 2) Preparing FeCoCu Medium-Entropy Alloy Powders

The porous oxide precursor powders obtained in step 1) is grinded fully, and then reduced by hydrogen at 750° C. for 2 h to obtain FeCoCu mixed powders. The FeCoCu mixed powders is performed high-energy ball-milling and sieved to obtain the FeCoCu medium-entropy alloy powders. A ball to powder weight ratio of the high-energy ball-milling is 5:1; a rotating speed of the high-energy ball-milling is 400 rpm, and a time of the high-energy ball-milling is 48 h.

Step 3) Preparing Wolfram Carbide (WC)-FeCoCu Mixed Powders

A mass ratio of the FeCoCu medium-entropy alloy powders obtained in step 2): 0.8 μm ultra-fine WC powders being 1:9 mixes to obtain mixed alloy powders. PEG, 3.5% of a total mass of WC-10FeCoCu, as a binder and 100 mL ethanol absolute are added into the mixed alloy powders to obtain mixed slurry after ball-milling. The mixed slurry is dried in vacuum, ground, and sieved to prepare WC-10FeCoCu powders mixture. A ball to powder weight ratio of the ball-milling is 10:1, a rotating speed of the ball-milling is 400 rpm, and a time of the ball-milling is 24 h.

Step 4) Preparing a WC-FeCoCu Cemented Carbide

The WC-10FeCoCu powders mixture obtained in step 3) is pressed into shape in a steel mold under a pressure of 100 MPa to obtain a shaped green body; the shaped green body is placed in a tubular furnace to remove the binder under hydrogen atmosphere at 550° C. for 3 h to obtain a binder-removing green body, and then the binder-removing green body is placed in a microwave sintering furnace under a mixed atmosphere of nitrogen and hydrogen at 1400° C. for 15 min to obtain a WC-10FeCoCu cemented carbide.

Embodiment 6

(1) Relative Density Test

Based on Archimedes principle, densities of the WC-FeCoCu cemented carbide sintered body samples prepared in the embodiments 1-5 are tested by drainage method. The sample is put on an analytical balance to measure a mass $m_1$. Then, the sample is put on a balance tray immersed in the deionized water to measure a mass $m_2$. Finally, according to the Archimedes principle, the actual density of the sample is calculated as follows:

$$\rho_{sample} = \frac{m_1}{m_{1-m_2}} \quad (1)$$

A theoretical density of the WC-FeCoCu cemented carbide can be estimated by a sum rule according to the following formula:

$$\rho_{theorical} = \frac{100}{\frac{a_1}{\rho_1} + \frac{a_2}{\rho_2} + \ldots + \frac{a_n}{\rho_n}} \quad (2)$$

The $\rho_{theorical}$ illustrates the theoretical density of the alloy, $a_1$-$a_n$ each illustrate the mass fractions of components of the alloy, $\rho_1$-$\rho_n$ illustrate the theoretical density of the components of the alloy, where a unit of the $a_1$-$a_n$ is used with a symbol of % (referred to a mass fraction), and a unit of the $\rho_{theorical}$ and the $\rho_1$-$\rho_n$ is g/cm$^3$ (referred to a ratio of mass to volume)

The measured relative density is shown in Table 1.

(2) Hardness Test

The hardness of the WC-FeCoCu cemented carbide sintered body samples prepared in the embodiments 1-5 is tested with a Bovey hardness tester (referred to a type of the tester, HBV-30A, China). The sample surface to be tested need be polished by 400, 600 and 800 mesh diamond sand table to obtain a mirror surface. The polished sample is put on a stage, using 30 kgf (referred to a unit of force) as loading load, and keeping the test force for 15 s. For each sample, 10 different positions are selected to test respectively to take an average value. The test results are shown in Table 1.

(3) Fracture Toughness Test

The fracture toughness of the WC-FeCoCu cemented carbide sintered body sample prepared in the embodiments 1-5 is tested by indentation method. Specifically, crack length around the hardness indentation is measured after testing the hardness of the samples, and the fracture toughness ($K_{IC}$) is calculated by the following formula:

$$K_{IC} = 0.15 \sqrt{HV30/\Sigma L} \quad (3)$$

HV30 illustrates the Vickers hardness of the sample with a unit of N/mm² (referred to a ratio of force to area). The symbol of ΣL illustrates a total length of fractures, which is calculated by the formula as follows, with a unit of millimeter (mm).

$$\Sigma L = L_1 + L_2 + L_3 + L_4$$

Calculation results are shown in Table 1.

TABLE 1 performance of the samples in the embodiments

| Embodiment | Relative density (%) | Hardness (MPa) | Fracture toughness (N/mm²) | Grain size (nm) |
|---|---|---|---|---|
| 1 | 98.73 | 1556.45 | 15.45 | 828 |
| 2 | 96.46 | 1232.12 | 19.94 | 856 |
| 3 | 99.12 | 1754.32 | 14.45 | 410 |
| 4 | 99.56 | 1912.63 | 11.61 | 628 |
| 5 | 99.24 | 1664.23 | 14.56 | 853 |

Table 1 shows properties of the sample in the each embodiment. It can be seen from the above table that when a raw material to prepare the cemented carbide with medium-entropy as binding phase is selected from the WC powders that a particle size falls between 0.4 μm and 0.8 μm, the WC particle size does not grow abnormally. It illustrates that the FeCoCu medium-entropy alloy can inhibit the growth of the WC grains compared with the traditional metal Co as binding phase. At the same time, the property the cemented carbide has also improved by using the FeCoCu medium-entropy alloy as binding phase.

(4) Microstructure Observation by Field Emission Scanning Electron Microscope

The surface and fracture morphology of the WC-FeCoCu sintered body sample prepared in the embodiment 1 are observed by the field emission scanning electron microscope. The type of the field emission scanning electron microscope is FE-SEM SU8020 Hitachi. Firstly, the test surface of the sample is grinded and polished by 120 meshes, 240 meshes, 400 meshes, 600 meshes and 800 meshes diamond sand table to obtain a flat mirror surface, and then the sample is measured. In order to avoid contamination and oxidation of the sample, a new fracture is temporarily prepared before testing to ensure the reliability of the experimental data.

Figure 2:
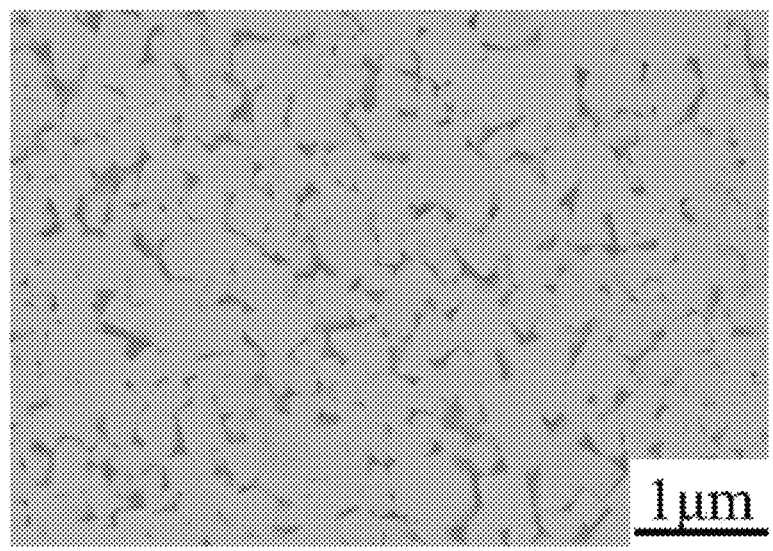
FIG. 2 is a backscattered scanning electron microscope diagram of WC-10FeCoCu cemented carbide prepared in an embodiment 3 according to the disclosure.
Figure 3:
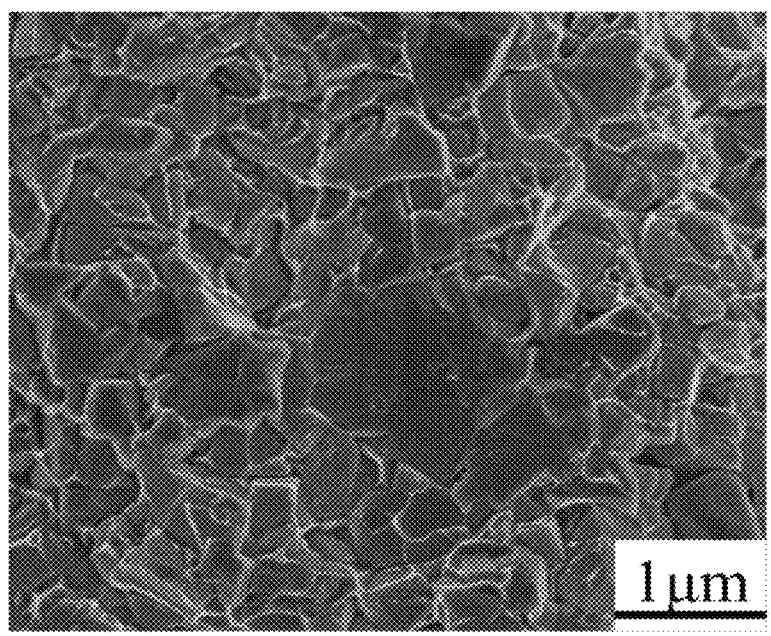
FIG. 3 is a scanning electron microscope diagram of a fracture of the WC-10FeCoCu cemented carbide prepared in the embodiment 3 according to the disclosure.

FIG. 2 is the backscattered scanning electron microscope diagram (FE-SEM, SU8020 Hitachi, Japan-a type of the electron microscope) of the WC-10FeCoCu cemented carbide prepared in the embodiment 3. It can be seen from FIG. 2 that there are no obvious defects on the sample surface and the density is high. The WC grains are fine and uniform without obvious abnormal growth. According to the Hall-Petch rule, the smaller the grain size, the higher the hardness. FIG. 3 is the scanning electron microscope diagram of a fracture of the WC-10FeCoCu cemented carbide prepared in the embodiment 3. It can be seen from FIG. 3 that there are tear edges on the surface of the coarser grains. The fracture of the WC-10FeCoCu cemented carbide coexists an intergranular fracture with a transgranular fracture, which makes the cemented carbide have higher strength and better toughness.

The above-described embodiments of the disclosure do not constitute a limitation on the scope of the protection of the disclosure. Any modification, equivalent replacement and improvement made within the spirit and principles of the disclosure shall be included in the scope of the protection of the disclosure.

What is claimed is:

1. A preparation method of cemented carbide with iron (Fe), cobalt (Co) and copper (Cu) medium-entropy alloy as binding phase, comprising:
    step 1) preparing precursor powders, comprising: dissolving cobaltous nitrate, cupric nitrate, ferric nitrate and glycine with a molar ratio in deionized water to obtain mixed solution after ultrasonic vibration, and heating the mixed solution in a muffle furnace to obtain porous oxide precursor powders;
    step 2) preparing FeCoCu medium-entropy alloy powders, comprising: fully grinding the oxide precursor powders obtained in step 1), performing reduction on the ground oxide precursor powders with hydrogen to obtain FeCoCu mixed powders and performing high-energy ball-milling and sieving on the FeCoCu mixed powders to obtain the FeCoCu medium-entropy alloy powders;
    step 3) preparing tungsten carbide (WC)-FeCoCu mixed powders, comprising: mixing the FeCoCu medium-entropy alloy powders obtained in step 2) with ultra-fine WC powders in a mass ratio to obtain mixed alloy powders, adding polyethylene glycol (PEG) as a binder and ethanol absolute as a medium to the mixed alloy powders to perform ball-milling on the mixed alloy powder, the PEG and the ethanol absolute to obtain a mixed slurry, drying the mixed slurry in vacuum, grinding and sieving the mixed slurry to obtain the WC-FeCoCu mixed powders;
    step 4) preparing a WC-FeCoCu cemented carbide, comprising: pressing the WC-FeCoCu mixed powders obtained in step 3) into a shape in a steel mold under a pressure between 100 mega Pascal (MPa) and 300 MPa to obtain a shaped green body, then placing the shaped green body in a tubular furnace to remove the binder under hydrogen atmosphere to obtain a binder-removing green body, and performing microwave sintering on the binder-removing green body in a microwave sintering furnace under a mixed atmosphere of nitrogen ($N_2$) and hydrogen ($H_2$) to obtain the WC-FeCoCu cemented carbide;
    wherein the molar ratio of the cobaltous nitrate:the cupric nitrate:the ferric nitrate:the glycine in step 1) is 1:1:1:(3-9);
    wherein a heating temperature of the mixed solution in step 1) is between 200 degree Celsius (° C.) and 350° C. and a heating time of the mixed solution is between 1 hour (h) and 5 h;
    wherein in step 3), the mass radio of the FeCoCu medium-entropy alloy powders:the ultra-fine WC powders is between 7:3 and 19:1, and a mass of the PEG is between 1% and 5% of a total mass of the WC-FeCoCu mixed powders; and
    wherein a temperature of the microwave sintering in step 4) is between 1100° C. and 1500° C. and a time of the microwave sintering is between 10 minutes (min) and 60 min.

2. The preparation method of cemented carbide with FeCoCu medium-entropy alloy as binding phase according to claim 1, wherein a reductive temperature of the oxide precursor powders in step 2) is between 500° C. and 750° C., and a reductive time of the oxide precursor powders is between 1 h and 4 h.

3. The preparation method of cemented carbide with FeCoCu medium-entropy alloy as binding phase according to claim 1, wherein a ball to powder weight ratio of the high-energy ball-milling in step 2) is between 5:1 and 20:1, a rotating speed of the high-energy ball-milling is between 100 revolutions per minute (rpm) and 500 rpm, and a time of the high-energy ball-milling is between 12 h and 72 h.

4. The preparation method of cemented carbide with FeCoCu medium-entropy alloy as binding phase according to claim 1, wherein a particle size of the ultra-fine WC powders in step 3) is between 0.4 micrometer (μm) and 0.8 μm.

5. The preparation method of cemented carbide with FeCoCu medium-entropy alloy as binding phase according to claim 1, wherein a ball to powder weight ratio of the ball-milling in step 3) is between 3:1 and 10:1, a rotating speed of the ball-milling is between 100 rpm and 400 rpm, and a time of the ball-milling is between 12 h and 72 h.

6. The preparation method of cemented carbide with FeCoCu medium-entropy alloy as binding phase according to claim 1, wherein a temperature of removing the binder in step 4) is between 400° C. and 800° C., and a holding time of removing the binder in step 4) is between 1 h and 5 h.

* * * * *